(12) United States Patent
Li et al.

(10) Patent No.: US 10,624,145 B2
(45) Date of Patent: Apr. 14, 2020

(54) SERVICE TRANSMISSION METHOD, APPARATUS, AND DEVICE

(71) Applicant: HUAWEI TECHNOLOGIES CO., LTD., Shenzhen, Guangdong (CN)

(72) Inventors: Yan Li, Beijing (CN); Fangyuan Zhu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/017,852

(22) Filed: Jun. 25, 2018

(65) Prior Publication Data

US 2018/0302941 A1 Oct. 18, 2018

Related U.S. Application Data

(63) Continuation of application No. PCT/CN2015/099003, filed on Dec. 25, 2015.

(51) Int. Cl.
*H04W 76/16* (2018.01)
*H04L 12/801* (2013.01)
(Continued)

(52) U.S. Cl.
CPC .......... *H04W 76/16* (2018.02); *H04L 45/24* (2013.01); *H04L 47/15* (2013.01); *H04L 69/14* (2013.01); *H04W 80/04* (2013.01); *H04W 88/16* (2013.01); *H04W 36/0011* (2013.01); *H04W 36/12* (2013.01)

(58) Field of Classification Search
None
See application file for complete search history.

(56) References Cited

U.S. PATENT DOCUMENTS 9,826,560 B2 * 11/2017 Kweon ................. H04L 45/16 370/328
2012/0099601 A1 4/2012 Haddad et al.
(Continued)

FOREIGN PATENT DOCUMENTS

CN 103168456 A 6/2013
CN 103517264 A 1/2014
(Continued)

*Primary Examiner* — Anh Vu H Ly
(74) *Attorney, Agent, or Firm* — Womble Bond Dickinson (US) LLP

(57) ABSTRACT

The present invention relates to the field of communications technologies and discloses service transmission methods, apparatus, and devices. In one embodiment, a method includes: obtaining, by a target server or user equipment, an Internet Protocol (IP) address assigned by a target gateway to the user equipment; establishing a Multipath Transmission Control Protocol (MPTCP) connection between the user equipment and the target server based on the IP address assigned by the target gateway to the user equipment, where the MPTCP connection between the user equipment and the target server and an MPTCP connection between the user equipment and a source server are bound to a same MPTCP session; and transmitting a service data packet using the MPTCP connection between the user equipment and the target server. The service data packet is transmitted using the target gateway so a transmission path is optimized and a service transmission delay is reduced.

20 Claims, 7 Drawing Sheets

```
┌─────────────────────────────────────────────────────┐   S31
│ A target server or UE obtains an IP address         │ /
│ assigned by a target gateway to the UE              │
└─────────────────────────────────────────────────────┘
                          │
                          ▼
┌─────────────────────────────────────────────────────┐   S32
│ The target server or the UE establishes an MPTCP    │ /
│ connection between the UE and the target server     │
│ based on the IP address assigned by the target      │
│ gateway to the UE                                    │
└─────────────────────────────────────────────────────┘
                          │
                          ▼
┌─────────────────────────────────────────────────────┐   S33
│ The target server or the UE transmits a service     │ /
│ data packet by using the MPTCP connection between   │
│ the UE and the target server                         │
└─────────────────────────────────────────────────────┘
```

(51) Int. Cl.
*H04L 12/707* (2013.01)
*H04L 29/06* (2006.01)
*H04W 80/04* (2009.01)
*H04W 88/16* (2009.01)
*H04W 36/12* (2009.01)
*H04W 36/00* (2009.01)

(56) References Cited

U.S. PATENT DOCUMENTS

| | | | | |
|---|---|---|---|---|
| 2012/0144062 A1* | 6/2012 | Livet | ............ | H04L 45/24 709/239 |
| 2015/0103804 A1 | 4/2015 | Gao et al. | | |
| 2015/0271725 A1* | 9/2015 | Lee | ............ | H04L 67/148 455/436 |
| 2016/0021645 A1 | 1/2016 | He | | |
| 2016/0242180 A1* | 8/2016 | Richards | ............ | H04W 4/70 370/328 |
| 2016/0249256 A1* | 8/2016 | Kweon | ............ | H04L 45/22 370/328 |
| 2016/0286441 A1* | 9/2016 | Kweon | ............ | H04W 36/0066 370/328 |
| 2016/0345238 A1* | 11/2016 | Roeland | ............ | H04W 36/0011 370/328 |
| 2017/0078244 A1 | 3/2017 | Zhang et al. | | |
| 2017/0118787 A1* | 4/2017 | Kekki | ............ | H04W 76/16 370/328 |
| 2017/0238215 A1* | 8/2017 | Jin | ............ | H04W 8/08 370/331 |
| 2017/0366618 A1* | 12/2017 | Vrzic | ............ | H04L 67/141 370/328 |
| 2018/0124676 A1* | 5/2018 | Zeng | ............ | H04W 36/36 370/328 |
| 2018/0227807 A1* | 8/2018 | Youn | ............ | H04W 36/00 370/328 |
| 2018/0254979 A1* | 9/2018 | Scahill | ............ | H04L 45/24 370/328 |
| 2018/0310350 A1* | 10/2018 | Stojanovski | ............ | H04W 36/0033 370/328 |

FOREIGN PATENT DOCUMENTS

| | | |
|---|---|---|
| CN | 104186006 A | 12/2014 |
| WO | 2015094043 A1 | 6/2015 |
| WO | 2015180141 A1 | 12/2015 |

* cited by examiner

SERVICE TRANSMISSION METHOD, APPARATUS, AND DEVICE

CROSS-REFERENCE TO RELATED APPLICATIONS

This application is a continuation of International Application No. PCT/CN2015/099003, filed on Dec. 25, 2015, the disclosure of which is hereby incorporated by reference in its entirety.

TECHNICAL FIELD

The present invention relates to the field of communications technologies, and in particular, to service transmission methods, apparatus, and devices.

BACKGROUND

Currently, for some services that have a relatively high transmission delay requirement, such as a video and an online game, servers are separately disposed in different regions, so that user equipment (UE) selects a relatively close server to provide a service. However, for UE with relatively strong mobility, when the UE moves from a serving range of a source server to a serving range of a target server, because an Internet Protocol (IP) address of the UE is not changed, the UE still performs service transmission using the source server that is relatively close to the UE before the movement and does not perform service transmission using the target server that is relatively close to the UE after the movement. To hand over from the source server to the target server to perform service transmission, the UE first needs to detach from a network and then reattach to a network. However, this process causes service interruption, and consequently service continuity is poor.

To enable the UE to hand over from the source server to the target server to perform service transmission on the premise that service continuity is ensured, a handover method is provided in the prior art. When the UE moves from a cell of a source base station to a cell of a target base station, the target base station and the source base station complete an X2 interface-based handover process, so that the UE connects to the source server using the target base station. After the X2 interface-based handover process is completed, the source server synchronizes a user context to the target server, so that the UE can obtain a downlink service data packet from the target server.

However, when user context synchronization is completed, because the IP address of the UE is not changed, a source gateway in the serving range of the source server is still used as an anchor. Consequently, although the downlink service data packet for the UE can be obtained from the target server, transmission is still performed using the source gateway, a transmission path is not optimal, and a service transmission delay is still relatively long.

SUMMARY

This application discloses embodiments for service transmission methods, apparatus, and devices to optimize transmission paths of an uplink service data packet and a downlink service data packet.

According to a first aspect, a service transmission method is provided, where the method includes:

obtaining, by a target server or UE, an Internet Protocol (IP) address assigned by a target gateway to the UE;

establishing a Multipath Transmission Control Protocol (MPTCP) connection between the UE and the target server based on the IP address assigned by the target gateway to the UE, where the MPTCP connection between the UE and the target server and an MPTCP connection between the UE and a source server are bound to a same MPTCP session; and transmitting a service data packet using the MPTCP connection between the UE and the target server.

In one embodiment, the UE or the target server transmits the service data packet using the MPTCP connection between the UE and the target server. The MPTCP connection between the UE and the target server and the MPTCP connection between the UE and the source server can be bound to the same MPTCP session. As such, the service data packet may be directly handed over from the MPTCP connection between the UE and the source server to the MPTCP connection between the UE and the target server for transmission, and therefore service continuity is not affected. In addition, the MPTCP connection between the UE and the target server can be established based on the IP address assigned by the target gateway to the UE. As such, when the service data packet is transmitted using the MPTCP connection between the UE and the target server, the service data packet can be transmitted using the target gateway so a transmission path is optimized and a service transmission delay is reduced.

In one embodiment, the obtaining an IP address assigned by a target gateway to the UE includes:

moving, by the UE, from a source base station to a target base station, and establishing, by the UE, a packet data network PDN connection to the target gateway using a control plane device, to obtain the IP address assigned by the target gateway.

In one embodiment, the UE establishes the PDN connection to the target gateway, so as to obtain the IP address assigned by the target gateway to the UE, and establish the MPTCP connection between the UE and the target server.

In another embodiment, the UE receives an indication message sent by the control plane device, where the indication message is used to instruct the UE to establish a PDN connection. When the indication message sent by the control plane device is received, the UE can establish the PDN connection to the target gateway.

In one embodiment, the establishing, by the UE, an MPTCP connection between the UE and the target server includes:

receiving, by the UE, an add address message sent by the source server, where the add address message includes an address of the target server and the IP address assigned by the target gateway to the UE; and establishing the MPTCP connection to the target server using the address of the target server and the IP address assigned by the target gateway to the UE.

In one embodiment, establishment of the MPTCP connection between the UE and the target server is initiated by the UE.

In another embodiment, establishment of the MPTCP connection between the UE and the target server may be initiated by the target server, provided that the UE completes a three-way handshake with the target server, as described in the following.

In one embodiment, the obtaining, by a target server, an IP address assigned by a target gateway to UE, and the establishing an MPTCP connection between the UE and the target server based on the IP address assigned by the target gateway to the UE include:

receiving, by the target server, a user context from the source server, where the user context includes the IP address assigned by the target gateway to the UE; and initiating an MPTCP connection establishment process to the UE using the IP address assigned by the target gateway to the UE.

In one embodiment, the transmitting, by the UE or the target server, a service data packet using the MPTCP connection between the UE and the target server includes:

adjusting a priority of the MPTCP connection between the UE and the target server, so that the priority of the MPTCP connection between the UE and the target server is higher than a priority of the MPTCP connection between the UE and the source server; and transmitting the service data packet using the MPTCP connection between the UE and the target server.

In one embodiment, handing over the service data packet to the MPTCP connection between the UE and the target server for transmission can be implemented by changing the priority of the MPTCP connection between the UE and the target server. In this case, transmission of the service data packet is not interrupted, and normal transmission of the service data packet is ensured.

In one embodiment, after the establishing, by the target server, an MPTCP connection between the UE and the target server, the method further includes:

sending, by the target server, a content handover complete event to the control plane device, to trigger the control plane device to initiate a PDN connection release process between the user equipment and a source gateway to the UE.

In one embodiment, after the establishing, by the UE, an MPTCP connection between the UE and the target server, the method further includes:

receiving, by the UE, a PDN connection release command initiated by the control plane device, to release a PDN connection to a source gateway, and further release the MPTCP connection between the UE and the source server; or actively initiating, by the UE, a PDN connection release process between the user equipment and the source gateway, to release the MPTCP connection between the UE and the source server.

In one embodiment, after the service data packet is handed over to be transmitted between the UE and the target server, a PDN connection between the UE and the source server is released, so as to release a resource occupied by the PDN connection.

In one embodiment, before the obtaining, by UE, an IP address assigned by a target gateway to the UE, the method further includes:

when the UE is in a cell of the source base station, establishing, by the UE, a PDN connection to a source gateway, obtaining an IP address assigned by the source gateway to the UE, and establishing the MPTCP connection to the source server using the IP address assigned by the source gateway to the UE.

In one embodiment, when the UE is in the cell of the source base station, the UE first establishes the MPTCP connection to the source server. In this way, when moving to a cell of the target base station, the UE can establish a new MPTCP connection to the target server to join the MPTCP session, so as to hand over, through MPTCP subflow handover, the service data packet from being transmitted between the UE and the source server to being transmitted between the UE and the target server.

According to a second aspect, a service transmission method is provided, where the method includes:

obtaining, by a source server from a control plane device, an IP address assigned by a target gateway to UE; and sending the IP address to the UE or a target server, so that the UE or the target server establishes an MPTCP connection between the UE and the target server using the IP address, and transmits a service data packet using the MPTCP connection between the UE and the target server, where the MPTCP connection between the UE and the target server and an MPTCP connection between the UE and the source server are bound to a same MPTCP session.

In one embodiment, the source server obtains, from the control plane device, the IP address assigned by the target gateway to the UE and sends the IP address to the UE or the target server, so that the UE or the target server can establish and use the MPTCP connection between the UE and the target server to transmit the service data packet. The MPTCP connection between the UE and the target server can be established based on the IP address assigned by the target gateway to the UE. As such, when the service data packet is transmitted using the MPTCP connection between the UE and the target server, the service data packet can be transmitted using the target gateway so a transmission path is optimized and a service transmission delay is reduced.

In one embodiment, the obtaining, by a source server from a control plane device, an IP address assigned by a target gateway to UE includes:

receiving, by the source server, a handover event sent by the control plane device, where the handover event includes location information of the UE and the IP address assigned by the target gateway to the UE.

In one embodiment, the sending, by the source server, the IP address to a target server includes:

transmitting, by the source server, a user context to the target server, where the user context includes the IP address assigned by the target gateway to the UE.

In one embodiment, the transmitting, by the source server, a user context to the target server includes:

determining, by the source server, an address of the target server based on location information of the UE, and sending the user context to the determined address of the target server.

In one embodiment, the sending, by the source server, the IP address to the UE includes:

sending, by the source server, an add address message to the UE, where the add address message includes an address of the target server and the IP address assigned by the target gateway to the UE.

According to a third aspect, a service transmission apparatus is provided, where the apparatus includes several units, such as an obtaining unit, a processing unit, and a transmission unit, and the several units are configured to implement the method provided in the first aspect.

According to a fourth aspect, a service transmission apparatus is provided, where the apparatus includes several units, such as an obtaining unit and a processing unit, and the several units are configured to implement the method provided in the second aspect.

According to a fifth aspect, a service transmission device is provided, where the service transmission device includes a processor, a memory, and a communications interface, the memory is configured to store a software program and a module, and the processor runs or executes the software program and/or the module stored in the memory to:

obtain an Internet Protocol IP address assigned by a target gateway to UE;

establish a Multipath Transmission Control Protocol MPTCP connection between the UE and a target server based on the IP address assigned by the target gateway to the UE, where the MPTCP connection between the UE and the target server and an MPTCP connection between the UE and a source server are bound to a same MPTCP session; and transmit a service data packet using the MPTCP connection between the UE and the target server.

According to a sixth aspect, a service transmission device is provided, where the service transmission device includes a processor, a memory, and a communications interface, the memory is configured to store a software program and a module, and the processor runs or executes the software program and/or the module stored in the memory to:

obtain, from a control plane device, an IP address assigned by a target gateway to UE; and send the IP address to the UE or a target server, so that the UE or the target server establishes an MPTCP connection between the UE and the target server using the IP address, and transmits a service data packet using the MPTCP connection between the UE and the target server, where the MPTCP connection between the UE and the target server and an MPTCP connection between the UE and a source server are bound to a same MPTCP session.

According to a seventh aspect, a computer readable storage medium is provided, where the computer readable storage medium is configured to store program code executed by the foregoing processor during service transmission. The program code includes an instruction used for implementing the method provided in the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
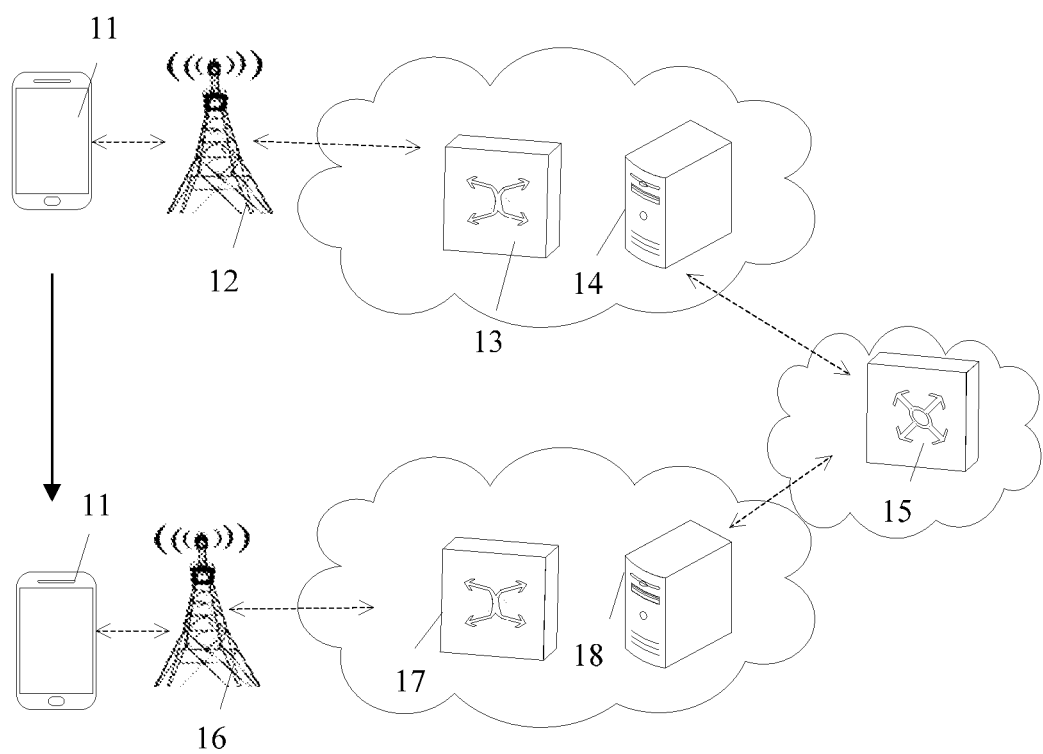
FIG. 1 is a schematic diagram of an application scenario according to an embodiment of the present invention.

To make the objectives, technical solutions, and advantages of the present invention clearer, the following further describes the implementations of the present invention in detail with reference to the accompanying drawings.

For ease of understanding the technical solutions provided in embodiments of the present invention, an application scenario of the present invention is first described with reference to FIG. 1.

The scenario includes two cells: a cell of a source base station and a cell of a target base station. In the application scenario of the present invention, UE 11 moves from the cell of the source base station (Source eNB) 12 to the cell of the target base station (Target eNB) 16.

The source base station 12 is in a serving range of a source gateway (Source GW) 13 and a source server 14, and the target base station 16 is in a serving range of a target gateway (Target GW) 17 and a target server 18. The source gateway 13 and the source server 14 are usually disposed in one equipment room and may be used as one network element. The target gateway 17 and the target server 18 are usually disposed in one equipment room and may also be used as one network element. The source gateway 13 (or the target gateway 17) and the source server 14 (the target server 18) are disposed in different regions, and the region is the serving range of the source gateway 13 (or the target gateway 17) and the source server 14 (the target server 18). When the UE 11 accesses, in the cell of the source base station 12, a service corresponding to the source server 14, the source base station 12 directly connects the UE 11 to the source gateway 13 so as to connect to the source server 14, thereby implementing service access of the UE 11.

A control plane device (Controller) 15 has functions such as user mobility management, user identity authentication, and user access control. The control plane device 15 is separately connected to the source base station 12 and the target base station 16 using an S1 interface, and the control plane device 15 is further separately connected to the source gateway 13 and the target gateway 17 using an S11 interface.

The UE 11 in the present invention may include a device having a wireless communication function, such as a handheld device, an in-vehicle device, a wearable device, a computing device, another processing device connected to a wireless modem, or UE in various forms, including a mobile station (MS), a terminal, terminal equipment, and the like. For ease of description, these devices are referred to as UE in the present invention.

Servers (the source server 14 and the target server 18) in the present invention are configured to provide a specific service for the UE 11. The server is usually a server for a service (such as a live video or an online game) that has a relatively high requirement for a service transmission delay. The servers are disposed in different regions, to ensure that a service transmission delay is relatively short when a user is moving.

Gateways (including the source gateway 13 and the target gateway 17) and the control plane device 15 in the present invention can correspond to different entities in different networks. For example, in an evolved packet system (EPS) network, the gateway may be a forwarding plane gateway. The forwarding plane gateway integrates forwarding plane functions of a serving gateway (S-GW) and a packet data network gateway (P-GW), and is configured to perform service data packet forwarding in the network, including functions such as routing and forwarding, data packet encapsulation, data packet statistics, and service quality execution. The control plane device 15 may be a mobility management entity (MME). In another network, the gateway and the control plane device 15 can correspond to other network entities. This is not described in detail in the embodiments of the present invention.

In the application scenario shown above, when the UE moves from the cell of the source base station to the cell of the target base station, the target base station and the source base station complete an X2 interface-based handover process. When the handover process is completed, a transmission path of an uplink service data packet of the UE is: the UE—the target base station—the source gateway—the source server, and a transmission path of a downlink service data packet is: the source server—the source gateway—the target base station—the UE. When the X2 interface-based handover process is completed, the source server synchronizes a user context to the target server. However, when user context synchronization is completed, a destination address of the uplink service data packet is still an IP address of the source server, an IP address of the UE is not changed, and the source gateway is still used as an anchor. Therefore, the transmission path of the uplink service data packet of the UE is: the UE—the target base station—the source gateway—the source server, and the transmission path of the downlink service data packet is: the target server—the source gateway—the target base station—the UE. In this case, both the transmission paths of the uplink service data packet and the downlink service data packet of the UE pass through the source gateway, the uplink service data packet and the downlink service data packet are not transmitted using the target gateway, and consequently the transmission paths are not optimal.

As such, the present invention provides a service transmission method, to ensure that uplink data and downlink data are transmitted using the target gateway 17 when the user context is transferred, so that the transmission paths are optimal.

Figure 2:
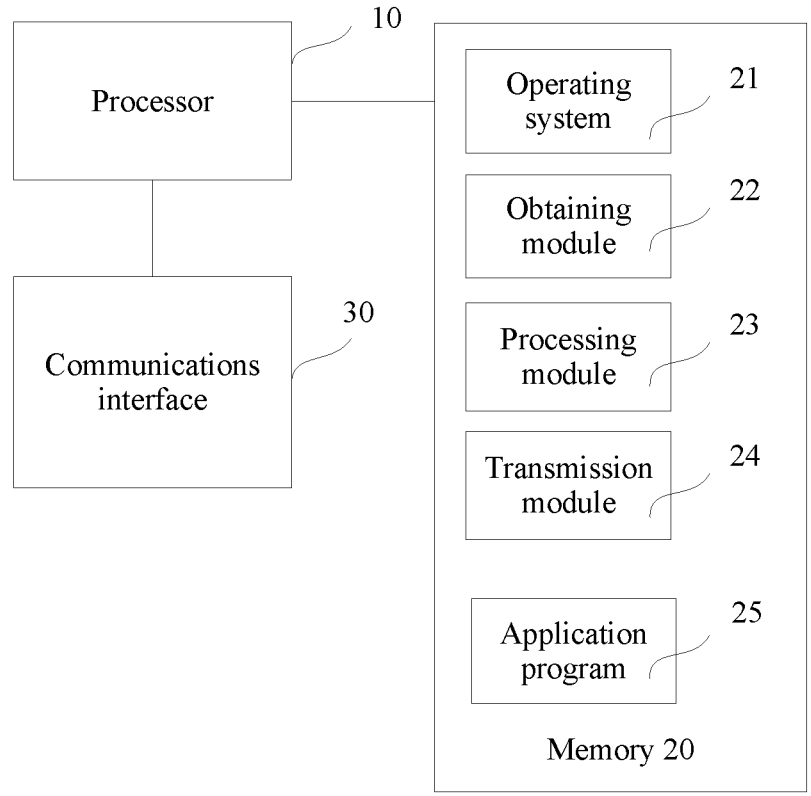
FIG. 2 is a schematic structural diagram of UE or a target server according to an embodiment of the present invention.

FIG. 2 is a schematic structural diagram of hardware of the UE or the target server shown in FIG. 1 according to one embodiment. As shown in FIG. 2, the UE or the target server includes a processor 10, a memory 20, and a communications interface 30. A person skilled in the art may understand that the structure shown in FIG. 2 imposes no limitation on the UE or the target server, and the UE or the target server may include more or fewer components than those shown in the figure, or may combine some components, or have different component arrangements.

The processor 10 is a control center of the UE or the target server and is connected to each part of the entire UE or the entire target server using various interfaces and lines. The processor 10 runs or executes a software program and/or a module stored in the memory 20, and invokes data stored in the memory 20, to execute various functions of the UE or the target server and process data, so as to perform overall control on the UE or the target server. The processor 10 may be implemented by a CPU or may be implemented by a network processor (NP) having a control plane function.

The memory 20 may be configured to store the software program and the module. The processor 10 runs the software program and the module stored in the memory 20, to execute various function applications and process data. The memory 20 may mainly include a program storage area and a data storage area. The program storage area may store an operating system 21, an obtaining module 22, a processing module 23, a transmission module 24, an application program 25 (such as multipath TCP (MPTCP) connection establishment) required by at least one function, or the like. The data storage area may store data (such as an IP address of the UE) or the like created according to use of the UE or the target server. The memory 20 may be implemented by any type of volatile or non-volatile storage device or by a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Correspondingly, the memory 20 may further include a memory controller, so as to provide the processor 10 with access to the memory 20.

The processor 10 runs the obtaining module 22 to execute the following function: obtaining an IP address assigned by a target gateway to the UE. The IP address assigned by the target gateway to the UE is an IP address assigned by the target gateway to the UE after the UE moves from a cell of a source base station to a cell of a target base station. The processor 10 runs the processing module 23 to execute the following function: establishing a multipath TCP connection between the UE and the target server based on the IP address assigned by the target gateway to the UE. The MPTCP connection between the UE and the target server and an MPTCP connection between the UE and a source server are bound to a same MPTCP session. The target base station and the target gateway are in a serving range of the target server, and the source base station and the source gateway are in a serving range of the source server. The processor 10 runs the transmission module 24 to execute the following function: transmitting a service data packet using the MPTCP connection between the UE and the target server.

In some embodiments, hardware of the source server or the control plane device shown in FIG. 1 may be similar to the structure of the UE or the target server shown in FIG. 2, except the transmission module 24 may not be included. In one embodiment, the processor 10 of the source server or the control plane device runs the obtaining module 22 to execute the following function: obtaining, from the control plane device, the IP address assigned by the target gateway to the UE. The IP address assigned by the target gateway to the UE is the IP address assigned by the target gateway to the UE after the UE moves from the cell of the source base station to the cell of the target base station. The processor 10 runs the processing module 23 to execute the following operations: sending, to the UE or the target server, the IP address assigned by the target gateway to the UE, so that the UE or the target server establishes the MPTCP connection between the UE and the target server based on the IP address assigned by the target gateway to the UE, and transmits the service data packet using the MPTCP connection between the UE and the target server. The MPTCP connection between the UE and the target server and the MPTCP connection between the UE and the source server can be bound to the same MPTCP session. The target base station and the target gateway can be in the serving range of the target server, and the source base station and the source gateway can be in the serving range of the source server.

Figure 3:
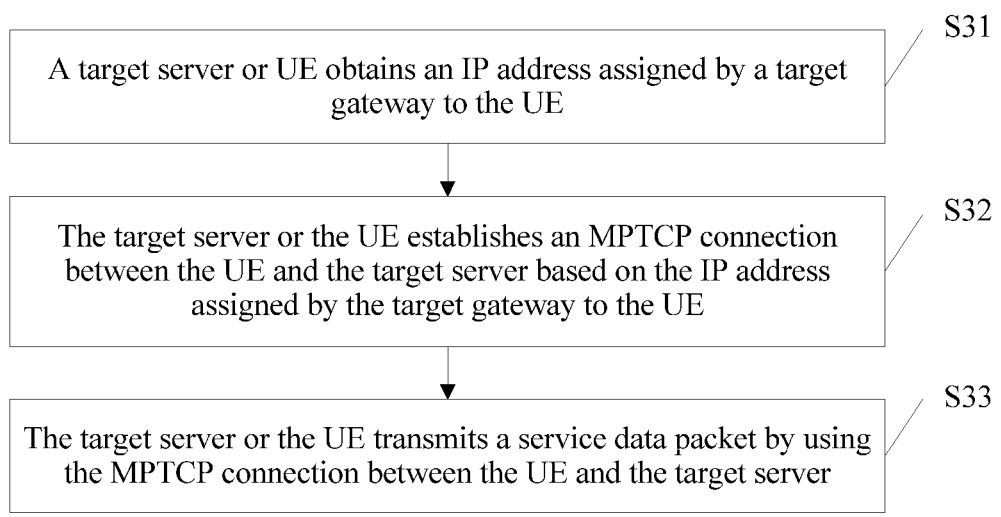
FIG. 3 is a flowchart of a service transmission method according to an embodiment of the present invention.

FIG. 3 is a flowchart of a service transmission method according to an embodiment of the present invention. The method may be performed by the UE or the target server in the foregoing application scenario. As shown in FIG. 3, the method includes the following operations.

Operation S31: The target server or the UE obtains an IP address assigned by a target gateway to the UE. The IP address assigned by the target gateway to the UE is an IP address assigned by the target gateway to the UE after the UE moves from a cell of a source base station to a cell of a target base station.

Operation S32: The target server or the UE establishes an MPTCP connection between the UE and the target server based on the IP address assigned by the target gateway to the UE. The MPTCP connection between the UE and the target server and an MPTCP connection between the UE and a source server are bound to a same MPTCP session. The target base station is in a serving range of the target gateway and the target server, and the source base station is in a serving range of a source gateway and the source server.

Operation S33: The target server or the UE transmits a service data packet using the MPTCP connection between the UE and the target server.

In one embodiment of the present invention, the UE or the target server transmits the service data packet in the foregoing manner. Specifically, the UE or the target server transmits the service data packet using the MPTCP connection between the UE and the target server. The MPTCP connection between the UE and the target server and the MPTCP connection between the UE and the source server can bound to the same MPTCP session. Therefore, the service data packet may be directly handed over from the MPTCP connection between the UE and the source server to the MPTCP connection between the UE and the target server for transmission, and therefore service continuity is not affected. In addition, the MPTCP connection between the UE and the target server can be established based on the IP address assigned by the target gateway to the UE. Therefore, when the service data packet is transmitted using the MPTCP connection between the UE and the target server, the service data packet can be transmitted using the target gateway so a transmission path is optimized and a service transmission delay is reduced.

Figure 4:
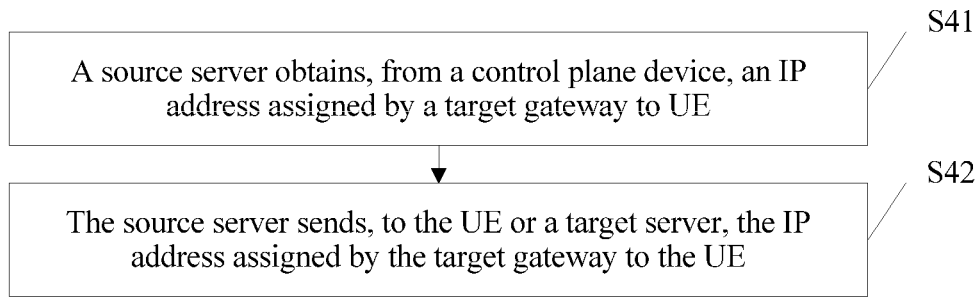
FIG. 4 is a flowchart of another service transmission method according to an embodiment of the present invention.

FIG. 4 is a flowchart of a service transmission method according to an embodiment of the present invention. The method may be performed by the source server in the foregoing application scenario. As shown in FIG. 4, the method includes the following operations.

Operation S41: The source server obtains, from a control plane device, an IP address assigned by a target gateway to UE. The IP address assigned by the target gateway to the UE is an IP address assigned by the target gateway to the UE after the UE moves from a cell of a source base station to a cell of a target base station.

Operation S42: The source server sends, to the UE or a target server, the IP address assigned by the target gateway to the UE, so that the UE or the target server establishes an MPTCP connection between the UE and the target server based on the IP address assigned by the target gateway to the UE, and transmits a service data packet using the MPTCP connection between the UE and the target server. The MPTCP connection between the UE and the target server and an MPTCP connection between the UE and the source server are bound to a same MPTCP session. The target base station is in a serving range of the target gateway and the target server, and the source base station is in a serving range of a source gateway and the source server.

In one embodiment of the present invention, the source server sends, to the UE or the target server, the IP address assigned by the target gateway to the UE, so that the UE or the target server can establish and use the MPTCP connection between the UE and the target server to transmit the service data packet. The MPTCP connection between the UE and the target server and the MPTCP connection between the UE and the source server can be bound to the same MPTCP session. As such, the service data packet may be directly handed over from the MPTCP connection between the UE and the source server to the MPTCP connection between the UE and the target server for transmission, and service continuity is not affected. In addition, the MPTCP connection between the UE and the target server can be established based on the IP address assigned by the target gateway to the UE. As such, when the service data packet is transmitted using the MPTCP connection between the UE and the target server, the service data packet is transmitted using the target gateway so a transmission path is optimized and a service transmission delay is reduced.

Figure 5A:
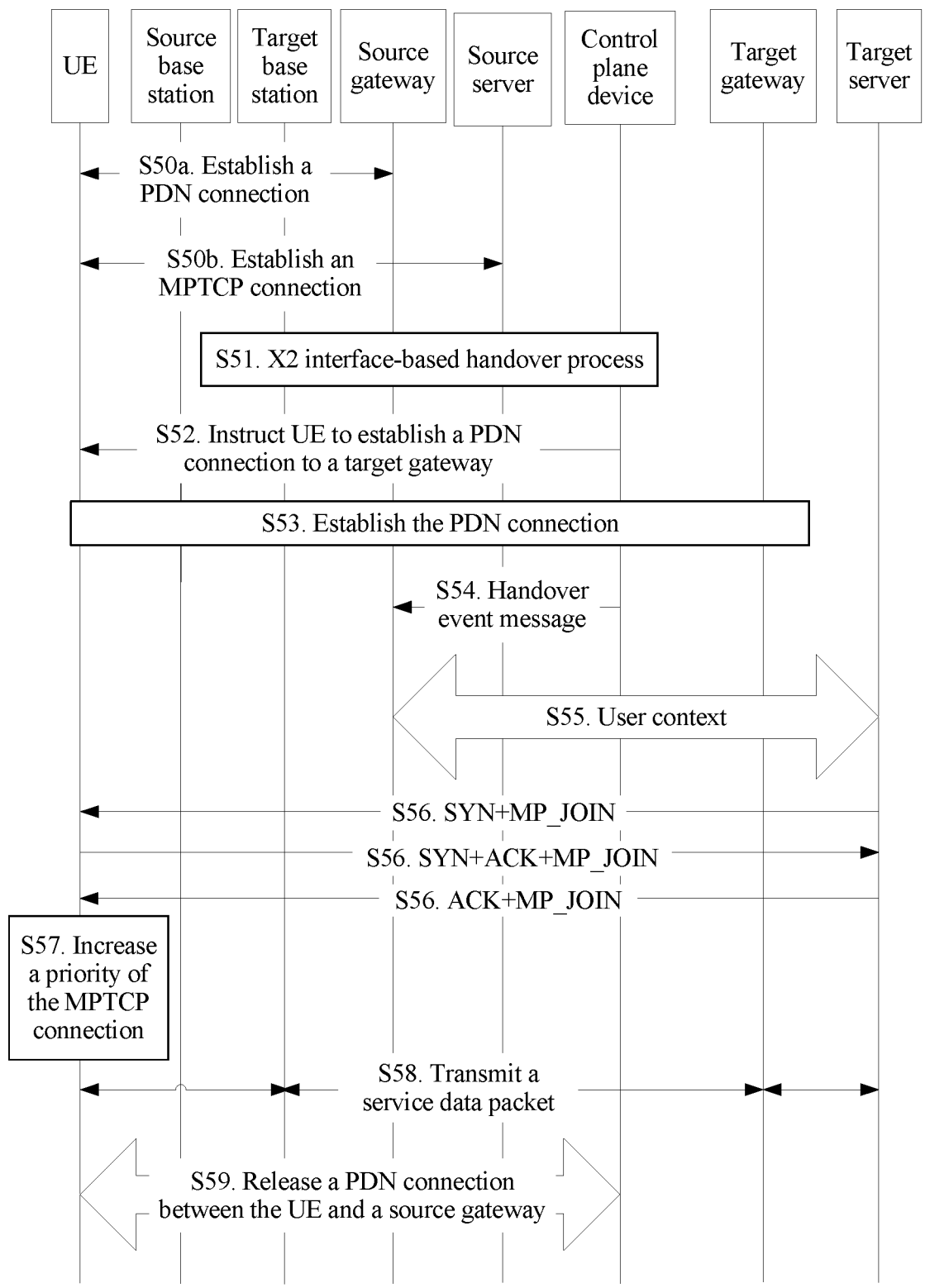
FIG. 5a is a flowchart of another service transmission method according to an embodiment of the present invention.

FIG. 5a is a flowchart of a service transmission method according to an embodiment of the present invention. As shown in FIG. 5a, the method includes the following operations.

Operation S50a: When UE is in a cell range of a source base station, the UE establishes a packet data network (PDN) connection to a source gateway, and obtains an IP address assigned by the source gateway.

In one embodiment, a control plane device is used to establish the PDN connection to the source gateway and to obtain the IP address assigned by the source gateway. A basic process of operation S50a can be as follows:

The UE sends a PDN connection request message to the control plane device. The control plane device obtains user information from an HSS. The control plane device sends a session creation request message to the source gateway based on the user information. The source gateway assigns the IP address to the UE based on the session creation request message. The source gateway sends a session creation response message to the control plane device. The session creation response message can include the IP address. The control plane device sends a bearer establishment request message to the source base station. The bearer establishment request message can include a PDN connection establishment accept message and the IP address. The UE obtains the IP address from the source base station. It is considered by default that a bearer is established between the UE and the source gateway.

Operation S50b: The UE establishes an MPTCP connection to a source server based on the IP address assigned by the source gateway to the UE.

In this operation, the UE and the source server establish the MPTCP connection based on a TCP three-way handshake process. An example process can be as follows:

The first handshake: The UE sends a SYN packet (syn=j) to the source server and enters a SYN_SEND state, to wait for acknowledgment of the source server, where j represents a sequence number.

The second handshake: The source server receives the SYN packet and sends a SYN+ACK packet (syn=k, and ack=j+1) to the UE, and the source server enters a SYN_RECV state, where k represents a sequence number.

The third handshake: The UE receives the SYN+ACK packet and sends an ACK packet (ack=k+1) to the source server, and the UE and the source server enter an ESTABLISHED state, to complete a three-way handshake.

Different from a common TCP three-way handshake, in the MPTCP three-way handshake process, the SYN packet, the SYN+ACK packet, and the ACK packet that are transmitted between the UE and the source server include a multipath capability MP_CAPABLE option or a multipath join MP_JOIN option. If the UE establishes the first MPTCP connection when initially accessing a network, the SYN packet, the SYN+ACK packet, and the ACK packet carry MP_CAPABLE. If the UE moves from another cell to a cell of a current base station (the source base station) and joins an existing original session (MPTCP connection), the SYN packet, the SYN+ACK packet, and the ACK packet can carry MP_JOIN.

MP_CAPABLE is used to identity that a local device (the UE or the source server) supports MPTCP, and performs mutual key interaction. MP_JOIN may include a peer Hash shared key and a token value of the original session (connection). The peer Hash shared key is used to perform authentication, and the token value of the original session is used to instruct a newly generated MPTCP connection to join the original session. In addition, MP_JOIN may further include a random number, so as to prevent a replay attack. MP_JOIN may further include an address of a transmit end (the UE or the source server). In this way, although NAT translation is performed on an address value of the transmit end, the address of the transmit end can still be obtained by a peer.

Operation S51: When the UE moves to a cell range of a target base station, the source base station initiates an X2 interface-based handover process, so that the target base station connects to the source gateway.

Figure 5B:
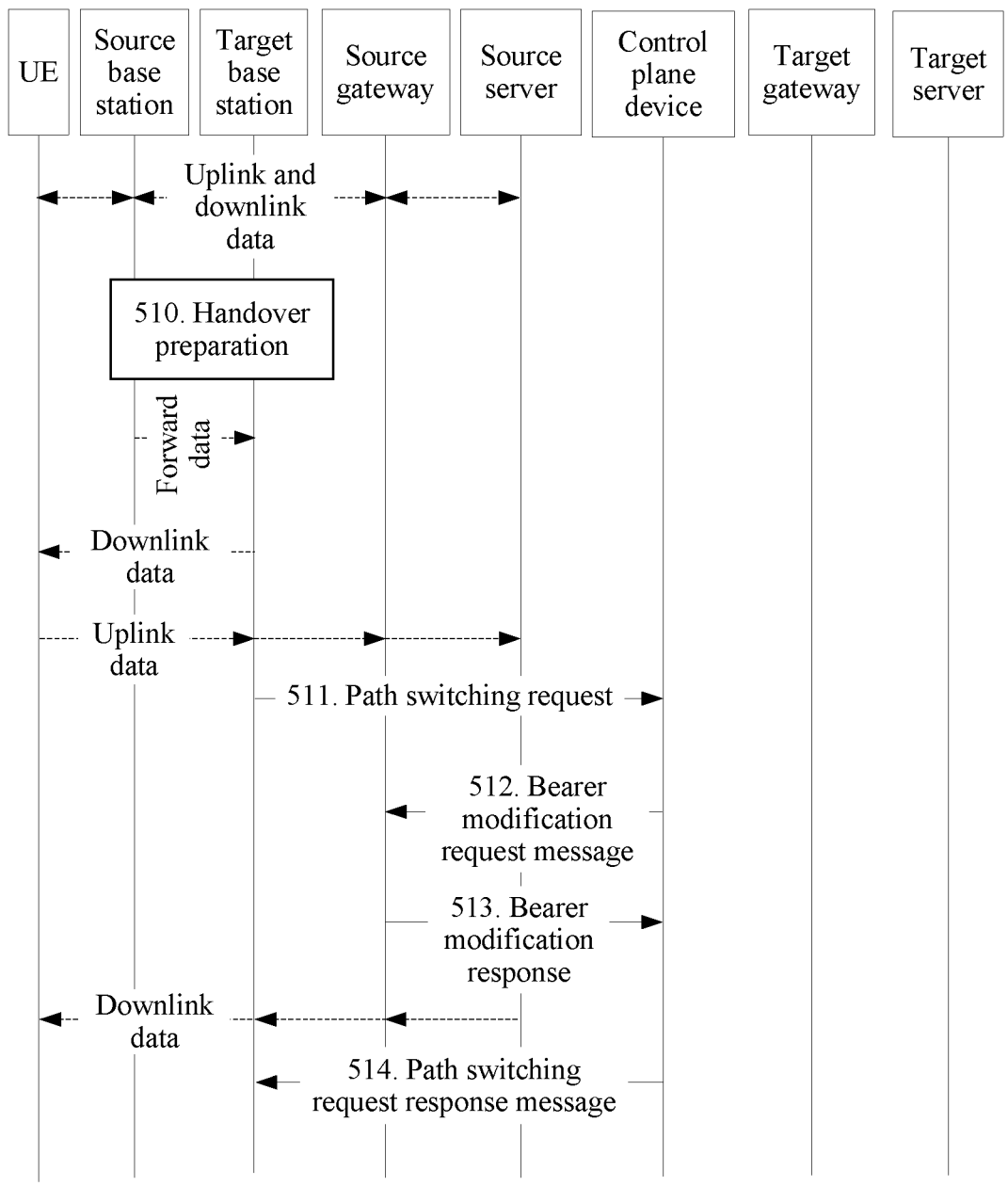
FIG. 5b is a diagram of an X2 interface-based handover process according to an embodiment of the present invention.

For example, the X2 interface-based handover process shown in FIG. 5b includes the following operations.

Operation 510. The source base station interacts with the target base station, to perform handover preparation. The handover preparation includes: The source base station configures a measurement report of the UE based on a roaming restriction; the UE sends a report according to a predetermined measurement rule; and the source base station determines, based on the report and radio resource management (RRM) information, whether the UE needs to be handed over. When the UE needs to be handed over, the source base station sends a handover request to the target base station. The target base station performs admission control based on received quality of service (QoS) information and returns a handover acknowledgment.

Operation 511. The target base station sends a path switching request to a control plane device, to notify the control plane device that a cell serving the UE has changed. The switching request includes a tracking area identity (TAI)+E-UTRAN cell global identifier (ECGI) of a target cell and a list of EPS bearers that need to be switched.

Operation 512. The control plane device sends a bearer modification request message to the source gateway. The bearer modification request message includes an address of the target base station and a user plane tunnel endpoint identifier (TEID) that is used to transmit downlink data.

Operation 513. The source gateway returns a bearer modification response to the control plane device. In this case, the source gateway may transmit a downlink service data packet based on the obtained address of the target base station and the TEID.

Operation 514. The control plane device sends a path switching request response message to the target base station. In this case, the X2 interface-based handover is completed, and the target eNB is connected to the source gateway.

Operation S52: After the X2 interface-based handover process is completed, the control plane device instructs the UE to establish a PDN connection to a target gateway.

For example, the control plane device sends an indication message to the UE, to instruct the UE to establish a PDN connection.

Operation S53: The UE establishes a PDN connection to the target gateway and obtains an IP address assigned by the target gateway.

For example, the control plane device is used to establish a PDN connection to the target gateway and to obtain the IP address assigned by the target gateway. An example process of operation S53 is as follows:

The UE sends a PDN connection request message to the control plane device. The control plane device sends a session creation request message to the target gateway based on user context information. The target gateway assigns the IP address to the UE based on the session creation request message. The target gateway sends a session creation response message to the control plane device. The session creation response message includes the IP address. The control plane device sends a bearer establishment request message to the target base station. The bearer establishment request message includes a PDN connection establishment accept message and the IP address. The UE obtains the IP address from the target base station. It is considered by default that a bearer is established between the UE and the target gateway.

Operation S54: After the PDN connection is established, the control plane device sends a handover event (Handover Trigger) message to the source server. The handover event message can include location information of the UE and the IP address assigned by the target gateway to the UE.

The location information of the UE is used when the source server determines an address of a target server based on the location information, so that the source server transmits the user context to the target server. For example, when the UE is currently located in Beijing, it is determined that the target server is a server for Beijing.

Refer to operation S55 for an example handover process.

Operation S55: The source server transmits a user context to a target server. The user context includes the IP address assigned by the target gateway to the UE and information about the MPTCP connection between the UE and the source server. The information about the MPTCP connection between the UE and the source server can include a token value. In addition to the foregoing content, the user context information may include the location information of the UE and information related to application configuration, so that the target server can transmit service data required by the UE to the UE.

In one embodiment, the source server transmitting the user context to the target server includes: determining the address of the target server based on the location information of the UE, and sending the user context to the determined address of the target server.

In one embodiment, the user context is sent to the determined address of the target server in the following manners:

Manner 1: The source server transmits the user context to the target server using a media independent handover (MIH) communication protocol.

Manner 2: The source server transmits the user context to the target server using a virtual machine or a Docker migration technology.

Operation S56: The target server establishes an MPTCP connection to the UE based on the IP address assigned by the target gateway to the UE. The MPTCP connection and the MPTCP connection between the UE and the source server can use one TCP session.

For example, the target server and the UE can establish the MPTCP connection based on a TCP three-way handshake process. An example process can be as follows:

The first handshake: The target server sends a SYN packet (syn=j) to the UE and enters a SYN_SEND state, to wait for acknowledgment of the UE.

The second handshake: The UE receives the SYN packet and sends a SYN+ACK packet (syn=k, and ack=j+1) to the target server, and the UE enters a SYN_RECV state.

The third handshake: The target server receives the SYN+ACK packet and sends an ACK packet (ack=k+1) to the UE, and the target server and the UE enter an ESTABLISHED state, to complete a three-way handshake.

The SYN packet, the SYN+ACK packet, and the ACK packet can include an MP_JOIN option.

Operation S57: The UE increases a priority of the MPTCP connection between the UE and the target server, so that the priority of the MPTCP connection between the UE and the target server is higher than a priority of the MPTCP connection between the UE and the source server.

Operation S58: The UE transmits a service data packet using the MPTCP connection between the UE and the target server.

Operation S59: The UE or the control plane device releases the PDN connection between the UE and the source gateway.

In one embodiment, operation S59 includes: The target server sends a content handover complete event to the control plane device, to trigger the control plane device to initiate a PDN connection release process between the user equipment and the source gateway to the UE.

In one embodiment, operation S59 includes: The UE receives a PDN connection release command initiated by the control plane device, to release the PDN connection to the source gateway, and further release the MPTCP connection between the UE and the source server; or the UE actively initiates a PDN connection release process between the user equipment and the source gateway, to release the MPTCP connection between the UE and the source server.

In some embodiments of the present invention, the UE or the target server transmits the service data packet in the following manner. For example, the UE or the target server transmits the service data packet using the MPTCP connection between the UE and the target server. The MPTCP connection between the UE and the target server and the MPTCP connection between the UE and the source server can be bound to the same MPTCP session. As such, the service data packet may be directly handed over from the MPTCP connection between the UE and the source server to the MPTCP connection between the UE and the target server for transmission, and therefore service continuity is not affected. In addition, the MPTCP connection between the UE and the target server can be established based on the IP address assigned by the target gateway to the UE. Therefore, when the service data packet is transmitted using the MPTCP connection between the UE and the target server, the service data packet can be transmitted using the target gateway so a transmission path is optimized and a service transmission delay is reduced.

Figure 6:
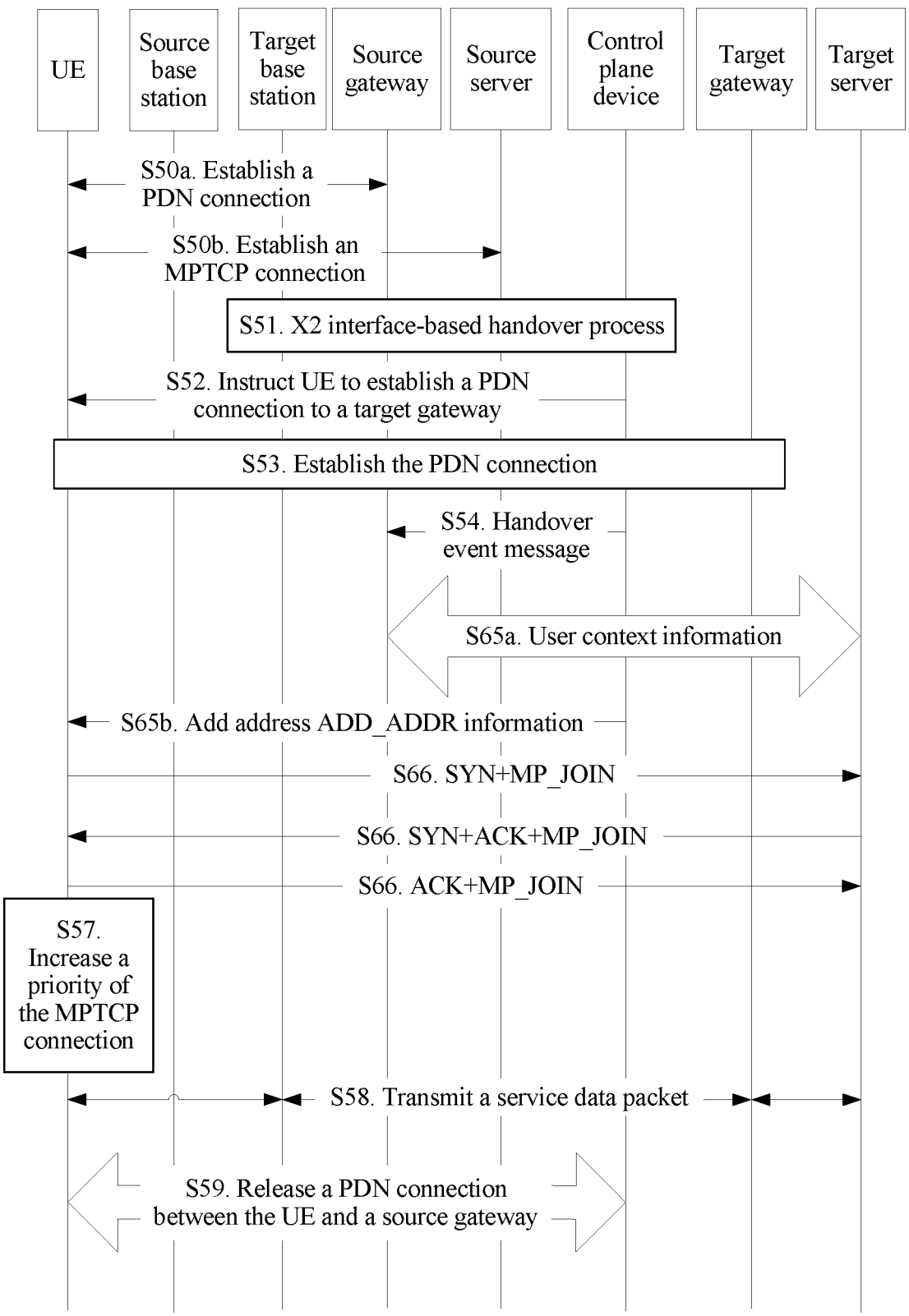
FIG. 6 is a flowchart of another service transmission method according to an embodiment of the present invention.

FIG. 6 is a flowchart of a service transmission method according to an embodiment of the present invention. As shown in FIG. 6, compared with the method provided in FIG. 5a, one difference for the method of FIG. 6 lies in that after a source server transmits a user context to a target server, the source server sends ADD_ADDR information to UE using an MPTCP connection between the UE and the source server, to trigger the UE to establish an MPTCP connection between the UE and the target server. The method of FIG. 6 includes the following operations.

Operation S50a: When UE is in a cell range of a source base station, the UE establishes a PDN connection to a source gateway, and obtains an IP address assigned by the source gateway.

Operation S50b: The UE establishes an MPTCP connection to a source server based on the IP address assigned by the source gateway to the UE.

Operation S51: When the UE moves to a cell range of a target base station, the source base station initiates an X2 interface-based handover process, so that the target base station connects to the source gateway.

Operation S52: After the X2 interface-based handover process is completed, a control plane device instructs the UE to establish a PDN connection to a target gateway.

Operation S53: The UE establishes a PDN connection to the target gateway and obtains an IP address assigned by the target gateway.

Operation S54: After the PDN connection is established, the control plane device sends a handover event message to the source server. The handover event message can include the IP address assigned by the target gateway to the UE.

Operation S65a: The source server transmits a user context to a target server. The user context can differ from the user context in operation S55 in that the user context does not need to include the IP address assigned by the target gateway to the UE and information about the MPTCP connection between the UE and the source server.

For example, a manner in which the source server transmits the user context to the target server may be the same as that of operation S55.

Operation S65b: The source server sends add address ADD_ADDR information to the UE. The add address message includes an address of the target server and the IP address assigned by the target gateway to the UE.

For example, the add address ADD_ADDR information may be sent using the MPTCP connection between the UE and the source server.

In one embodiment, the add address information further includes a port number of the target server.

Further, in operation S65b, the source server further sends an initiate immediately indication message to the UE. After receiving the add address ADD_ADDR information and the initiate immediately indication message, the UE initiates a process of establishing an MPTCP connection to the target server.

Operation S66: The UE establishes an MPTCP connection to the target server based on the IP address assigned by the target gateway to the UE. The MPTCP connection and the MPTCP connection between the UE and the source server use one TCP session.

For example, the UE and the target server can establish the MPTCP connection based on a TCP three-way handshake process. An example process is as follows:

The first handshake: The UE sends a SYN packet (syn=j) to the target server and enters a SYN_SEND state, to wait for acknowledgment of the target server.

The second handshake: The target server receives the SYN packet and sends a SYN+ACK packet (syn=k, and ack=j+1) to the UE, and the target server enters a SYN_RECV state.

The third handshake: The UE receives the SYN+ACK packet and sends an ACK packet (ack=k+1) to the target server, and the UE and the target server enter an ESTABLISHED state, to complete a three-way handshake.

The SYN packet, the SYN+ACK packet, and the ACK packet can include an MP_JOIN option.

Operation S57: The UE increases a priority of the MPTCP connection between the UE and the target server, so that the priority of the MPTCP connection between the UE and the target server is higher than a priority of the MPTCP connection between the UE and the source server.

Operation S58: The UE transmits a service data packet using the MPTCP connection between the UE and the target server.

Operation S59: The UE or the control plane device releases the PDN connection between the UE and the source gateway.

In one embodiment of the present invention, the UE or the target server transmits the service data packet in the following manner. For example, the UE or the target server transmits the service data packet using the MPTCP connection between the UE and the target server. The MPTCP connection between the UE and the target server and the MPTCP connection between the UE and the source server can bound to the same MPTCP session. As such, the service data packet may be directly handed over from the MPTCP connection between the UE and the source server to the MPTCP connection between the UE and the target server for transmission, and therefore service continuity is not affected. In addition, the MPTCP connection between the UE and the target server can be established based on the IP address assigned by the target gateway to the UE. As such, when the service data packet is transmitted using the MPTCP connection between the UE and the target server, the service data packet can be transmitted using the target gateway so a transmission path is optimized and a service transmission delay is reduced.

Figure 7:
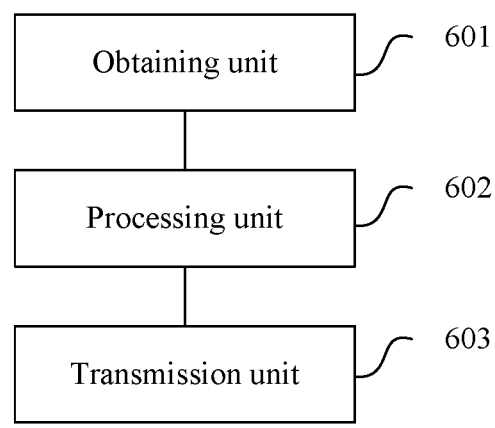
FIG. 7 is a schematic structural diagram of a service transmission apparatus according to an embodiment of the present invention.

FIG. 7 is a block diagram of a service transmission apparatus according to an embodiment of the present invention. The service transmission apparatus may be implemented as all or a part of UE (or a target server) using software, hardware, or a combination of software and hardware. The service transmission apparatus may include an obtaining unit 601, a processing unit 602, and a transmission unit 603.

The obtaining unit 601 is configured to obtain an IP address assigned by a target gateway to UE. The IP address assigned by the target gateway to the UE is an IP address assigned by the target gateway to the UE after the UE moves from a cell of a source base station to a cell of a target base station.

The processing unit 602 is configured to establish an MPTCP connection between the UE and a target server based on the IP address assigned by the target gateway to the UE. The MPTCP connection between the UE and the target server and an MPTCP connection between the UE and a source server can bound to a same MPTCP session. The target base station can be in a serving range of the target gateway and the target server, and the source base station can be in a serving range of a source gateway and the source server.

The transmission unit 603 is configured to transmit a service data packet using the MPTCP connection between the UE and the target server.

In an embodiment of the present invention, the UE or the target server transmits the service data packet in the following manner. For example, the UE or the target server transmits the service data packet using the MPTCP connection between the UE and the target server. The MPTCP connection between the UE and the target server and the MPTCP connection between the UE and the source server can be bounded to the same MPTCP session. As such, the service data packet may be directly handed over from the MPTCP connection between the UE and the source server to the MPTCP connection between the UE and the target server for transmission, and therefore service continuity is not affected. In addition, the MPTCP connection between the UE and the target server can be established based on the IP address assigned by the target gateway to the UE. As such, when the service data packet is transmitted using the MPTCP connection between the UE and the target server, the service data packet can be transmitted using the target gateway so a transmission path is optimized and a service transmission delay is reduced.

When the service transmission apparatus is UE, according to one embodiment, the obtaining unit 601 is configured to:

establish a packet data network PDN connection to the target gateway using a control plane device, to obtain the IP address assigned by the target gateway.

The processing unit 602, according to one embodiment, is configured to:

receive, by the UE, an add address message sent by the source server, where the add address message includes an address of the target server and the IP address assigned by the target gateway to the UE; and establish the MPTCP connection to the target server using the address of the target server and the IP address assigned by the target gateway to the UE.

When the service transmission apparatus is a target server, the obtaining unit 601, according to one embodiment, is configured to receive a user context from the source server. The user context can include the IP address assigned by the target gateway to the UE.

The processing unit 602 is configured, according to one embodiment, to initiate an MPTCP connection establishment process to the UE using the IP address assigned by the target gateway to the UE.

When the service transmission apparatus is UE or a target server, according to one embodiment, the transmission unit 603 is configured to:

adjust a priority of the MPTCP connection between the UE and the target server, so that the priority of the MPTCP connection between the UE and the target server is higher than a priority of the MPTCP connection between the UE and the source server; and transmit the service data packet using the MPTCP connection between the UE and the target server.

When the service transmission apparatus is a target server, according to one embodiment, the processing unit 602 is further configured to:

after establishing the MPTCP connection between the UE and the target server, send a content handover complete event to the control plane device, to trigger the control plane device to initiate a PDN connection release process between the user equipment and the source gateway to the UE.

When the service transmission apparatus is UE, according to one embodiment, the processing unit 602 is further configured to: after establishing the MPTCP connection between the UE and the target server, receive a PDN connection release command initiated by the control plane device, to release the PDN connection to the source gateway, and further release the MPTCP connection between the UE and the source server; or after establishing the MPTCP connection between the UE and the target server, actively initiate a PDN connection release process between the user equipment and the source gateway, to release the MPTCP connection between the UE and the source server.

In one embodiment, the processing unit 602 is further configured to:

before the IP address assigned by the target gateway to the UE is obtained, establish a PDN connection to the source gateway, obtain an IP address assigned by the source gateway to the UE, and establish the MPTCP connection to the source server using the IP address assigned by the source gateway to the UE.

Figure 8:
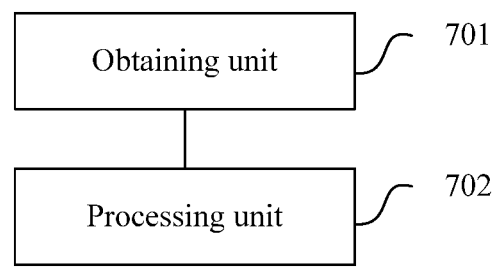
FIG. 8 is a schematic structural diagram of another service transmission apparatus according to an embodiment of the present invention.

FIG. 8 is a block diagram of a service transmission apparatus according to an embodiment of the present invention. The service transmission apparatus may be implemented as all or a part of a source server using software, hardware, or a combination of software and hardware. The service transmission apparatus may include an obtaining unit 701 and a processing unit 702.

The obtaining unit 701 is configured to obtain an IP address assigned by a target gateway to UE. The IP address assigned by the target gateway to the UE is an IP address assigned by the target gateway to the UE after the UE moves from a cell of a source base station to a cell of a target base station.

The processing unit 702 is configured to send, to the UE or a target server, the IP address assigned by the target gateway to the UE, so that the UE or the target server establishes an MPTCP connection between the UE and the target server based on the IP address assigned by the target gateway to the UE, and transmits a service data packet using the MPTCP connection between the UE and the target server. The MPTCP connection between the UE and the target server and an MPTCP connection between the UE and a source server are bound to a same MPTCP session. The target base station and the target gateway are in a serving range of the target server, and the source base station and a source gateway are in a serving range of the source server.

In one embodiment of the present invention, the source server sends, to the UE or the target server, the IP address assigned by the target gateway to the UE, so that the UE or the target server can establish and use the MPTCP connection between the UE and the target server to transmit the service data packet. The MPTCP connection between the UE and the target server and the MPTCP connection between the UE and the source server are bound to the same MPTCP session. Therefore, the service data packet may be directly handed over from the MPTCP connection between the UE and the source server to the MPTCP connection between the UE and the target server for transmission, and therefore service continuity is not affected. In addition, the MPTCP connection between the UE and the target server is established based on the IP address assigned by the target gateway to the UE. Therefore, when the service data packet is transmitted using the MPTCP connection between the UE and the target server, the service data packet can be transmitted using the target gateway so a transmission path is optimized and a service transmission delay is reduced.

When the service transmission apparatus is a source server, according to one embodiment, the obtaining unit 701 is configured to:

receive a handover event sent by a control plane device, where the handover event includes location information of the UE and the IP address assigned by the target gateway to the UE.

In one embodiment, the processing unit 702 is configured to:

determine an address of the target server based on the location information of the UE, and transmit a user context to the target server, where the user context includes the IP address assigned by the target gateway to the UE.

In one embodiment, the processing unit 702 is configured to:

send an add address message to the UE, where the add address message includes the address of the target server and the IP address assigned by the target gateway to the UE.

It should be noted that when the service transmission apparatus provided in the foregoing embodiment performs service transmission, division of the foregoing function units is merely an example; in actual application, the foregoing functions can be allocated to different function units for implementation as required, to be specific, an inner structure of the device is divided into different function units to implement all or a part of the functions described above. In addition, the service transmission apparatus provided in the foregoing embodiment is based on the same concept as the embodiment of the service transmission method. For a detailed implementation process of the service transmission apparatus, refer to the method embodiment, and details are not provided herein.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service transmission method, wherein the method comprises:

obtaining, by a target server or a user equipment, an Internet Protocol (IP) address assigned by a target gateway to the user equipment;

establishing a Multipath Transmission Control Protocol (MPTCP) connection between the user equipment and the target server based on the IP address assigned by the target gateway to the user equipment, wherein the MPTCP connection between the user equipment and the target server and an MPTCP connection between the user equipment and a source server are bound to a same MPTCP session; and transmitting a service data packet using the MPTCP connection between the user equipment and the target server;

wherein establishing an MPTCP connection between the user equipment and the target server comprises, receiving, by the target server of the user equipment, an add address message sent by the source server, wherein the add address message comprises an address of the target server and the IP address assigned by the target gateway to the user equipment.

2. The method according to claim 1, wherein obtaining, by the target server or the user equipment, an IP address assigned by a target gateway to the user equipment comprises:

moving, by the target server or the user equipment, from a source base station to a target base station, and establishing, by the target server or the user equipment, a packet data network (PDN) connection to the target gateway using a control plane device to obtain the IP address assigned by the target gateway.

3. The method according to claim 1, wherein establishing an MPTCP connection between the user equipment and the target server comprises:
  establishing the MPTCP connection to the target server using the address of the target server and the IP address assigned by the target gateway to the user equipment.

4. The method according to claim 1, wherein obtaining, by the target server or the user equipment, an IP address assigned by a target gateway to user equipment, and establishing an MPTCP connection between the user equipment and the target server based on the IP address assigned by the target gateway to the user equipment comprise:
  receiving, by the target server, a user context from the source server, wherein the user context comprises the IP address assigned by the target gateway to the user equipment; and
  initiating an MPTCP connection establishment process to the user equipment using the IP address assigned by the target gateway to the user equipment.

5. The method according to claim 1, wherein the transmitting, by the user equipment or the target server, a service data packet using the MPTCP connection between the user equipment and the target server comprises:
  adjusting a priority of the MPTCP connection between the user equipment and the target server, so that the priority of the MPTCP connection between the user equipment and the target server is higher than a priority of the MPTCP connection between the user equipment and the source server; and
  transmitting the service data packet using the MPTCP connection between the user equipment and the target server.

6. The method according to claim 1, wherein after establishing an MPTCP connection between the user equipment and the target server, the method further comprises:
  sending, by the target server or the user equipment, a content handover complete event to a control plane device, to trigger the control plane device to initiate, to the user equipment, a PDN connection release process between the user equipment and a source gateway.

7. The method according to claim 1, wherein after establishing an MPTCP connection between the user equipment and the target server, the method further comprises:
  receiving, by the target server or the user equipment, a PDN connection release command initiated by a control plane device, to release a PDN connection to a source gateway, and further release the MPTCP connection between the user equipment and the source server; or
  actively initiating, by the target server or the user equipment, a PDN connection release process between the user equipment and the source gateway, to release the MPTCP connection between the user equipment and the source server.

8. The method according to claim 1, wherein before obtaining, by the target server or the user equipment, an IP address assigned by a target gateway to the user equipment, the method further comprises:
  when the user equipment is in a cell of a source base station, establishing, by the user equipment, a PDN connection to a source gateway, obtaining an IP address assigned by the source gateway to the user equipment, and establishing the MPTCP connection to the source server using the IP address assigned by the source gateway to the user equipment.

9. A service transmission device, wherein the service transmission device comprises a processor and a memory, the memory is configured to store a software program, and the processor runs or executes the software program stored in the memory to:
  obtain an Internet Protocol (IP) address assigned by a target gateway to a user equipment;
  establish a Multipath Transmission Control Protocol (MPTCP) connection between the user equipment and a target server based on the IP address assigned by the target gateway to the user equipment, wherein the MPTCP connection between the user equipment and the target server and an MPTCP connection between the user equipment and a source server are bound to a same MPTCP session; and
  transmit a service data packet using the MPTCP connection between the user equipment and the target server,
  wherein the processor runs or executes the software program stored in the memory to further:
  receive an add address message sent by the source server, wherein the add address message comprises an address of the target server and the IP address assigned by the target gateway to the user equipment.

10. The service transmission device according to claim 9, wherein the processor runs or executes the software program stored in the memory to further:
  establish a packet data network (PDN) connection to the target gateway using a control plane device, to obtain the IP address assigned by the target gateway.

11. The service transmission device according to claim 9, wherein the processor runs or executes the software program stored in the memory to further:
  establish the MPTCP connection to the target server using the address of the target server and the IP address assigned by the target gateway to the user equipment.

12. The service transmission device according to claim 9, wherein the processor runs or executes the software program stored in the memory to further:
  receive a user context from the source server, wherein the user context comprises the IP address assigned by the target gateway to the user equipment; and
  initiate an MPTCP connection establishment process to the user equipment using the IP address assigned by the target gateway to the user equipment.

13. The service transmission device according to claim 9, wherein the processor runs or executes the software program stored in the memory to further:
  adjust a priority of the MPTCP connection between the user equipment and the target server, so that the priority of the MPTCP connection between the user equipment and the target server is higher than a priority of the MPTCP connection between the user equipment and the source server; and
  transmit the service data packet using the MPTCP connection between the user equipment and the target server.

14. The service transmission device according to claim 9, wherein the processor runs or executes the software program stored in the memory to further:
  after establishing the MPTCP connection between the user equipment and the target server, send a content handover complete event to a control plane device, to trigger the control plane device to initiate, to the user equipment, a PDN connection release process between the user equipment and a source gateway.

15. The service transmission device according to claim 9, wherein the processor runs or executes the software program stored in the memory to further:
- after establishing the MPTCP connection between the user equipment and the target server, receive a PDN connection release command initiated by a control plane device, to release a PDN connection to a source gateway, and further release the MPTCP connection between the user equipment and the source server; or
- after establishing the MPTCP connection between the user equipment and the target server, actively initiate a PDN connection release process between the user equipment and the source gateway, to release the MPTCP connection between the user equipment and the source server.

16. The service transmission device according to claim 9, wherein the processor runs or executes the software program stored in the memory to further:
- before the IP address assigned by the target gateway to the user equipment is obtained, establish a PDN connection to a source gateway, obtain an IP address assigned by the source gateway to the user equipment, and establish the MPTCP connection to the source server using the IP address assigned by the source gateway to the user equipment.

17. A non-transitory computer-readable medium storing computer instructions for execution by one or more processors, wherein the computer instructions instruct the one or more processors to perform the operations of:
- obtaining an Internet Protocol (IP) address assigned by a target gateway to the user equipment;
- establishing a Multipath Transmission Control Protocol (MPTCP) connection between the user equipment and a target server based on the IP address assigned by the target gateway to the user equipment, wherein the MPTCP connection between the user equipment and the target server and an MPTCP connection between the user equipment and a source server are bound to a same MPTCP session; and
- transmitting a service data packet using the MPTCP connection between the user equipment and the target server,
wherein establishing an MPTCP connection between the user equipment and the target server comprises:
- receive an add address message sent by the source server, wherein the add address message comprises an address of the target server and the IP address assigned by the target gateway to the user equipment.

18. The non-transitory computer-readable medium according to claim 17, wherein obtaining an IP address assigned by a target gateway to the user equipment comprises:
- moving from a source base station to a target base station, and establishing a packet data network (PDN) connection to the target gateway using a control plane device to obtain the IP address assigned by the target gateway.

19. The non-transitory computer-readable medium according to claim 17, wherein establishing an MPTCP connection between the user equipment and the target server comprises:
- establishing the MPTCP connection to the target server using the address of the target server and the IP address assigned by the target gateway to the user equipment.

20. The non-transitory computer-readable medium according to claim 17, wherein obtaining an IP address assigned by a target gateway to user equipment, and establishing an MPTCP connection between the user equipment and the target server based on the IP address assigned by the target gateway to the user equipment comprise:
- receiving a user context from the source server, wherein the user context comprises the IP address assigned by the target gateway to the user equipment; and
- initiating an MPTCP connection establishment process to the user equipment using the IP address assigned by the target gateway to the user equipment.

* * * * *

UNITED STATES PATENT AND TRADEMARK OFFICE
CERTIFICATE OF CORRECTION

PATENT NO. : 10,624,145 B2  
APPLICATION NO. : 16/017852  
DATED : April 14, 2020  
INVENTOR(S) : Yan Li and Fangyuan Zhu It is certified that error appears in the above-identified patent and that said Letters Patent is hereby corrected as shown below:

In the Claims

In Claim 1, Column 18, Line 55, replace "server of the user" with --server or the user--.

In Claim 17, Column 22, Line 6, replace "receive an" with --receiving an--.

Signed and Sealed this  
Twelfth Day of January, 2021

Andrei Iancu  
*Director of the United States Patent and Trademark Office*